United States Patent [19]

Idel

[11] 4,082,014
[45] Apr. 4, 1978

[54] WHEELHEAD

[76] Inventor: Vladimir Viktorovich Idel, Mukachevsky raion, selo Kolchino ulitsa Kirova, 11, Zakarpatskaya oblast, U.S.S.R.

[21] Appl. No.: 785,223

[22] Filed: Apr. 6, 1977

[30] Foreign Application Priority Data

Jul. 23, 1976 U.S.S.R. .............................. 2377403
Oct. 19, 1976 U.S.S.R. .............................. 2408301

[51] Int. Cl.² .................... B23D 63/12; B24B 53/12
[52] U.S. Cl. .................................... 76/43; 51/165.87; 51/5 D
[58] Field of Search .......... 76/37, 43; 51/5 D, 165.87, 51/165.88

[56] References Cited

U.S. PATENT DOCUMENTS 3,668,812   6/1972   Vladimir .......................... 51/165.87

FOREIGN PATENT DOCUMENTS 885,666   8/1953   Germany .......................... 51/165.87

*Primary Examiner*—Harold D. Whitehead
*Assistant Examiner*—Roscoe V. Parker
*Attorney, Agent, or Firm*—Robert E. Burns; Emmanuel J. Lobato; Bruce L. Adams

[57] ABSTRACT

A wheelhead in a grinding machine for sharpening the teeth of band saws is disclosed. The base of the wheelhead has horizontal guideways, whereon a support carrying a grinding wheel is mounted, and a flat portion inclined at 45° to the horizontal and serving as a guide for displacement of a dressing tool holder movably mounted on the support (9) on the side thereof opposite to the saw-teeth sharpening area. In addition, the wheelhead is provided with a device for holding the saw in the process of grinding off its weld. This device is mounted on the dressing tool holder in the operating area of the dressing tool. A saw-teeth sharpener furnished with the wheelhead being claimed provides for both sharpening the teeth of a band saw and grinding off its weld.

9 Claims, 10 Drawing Figures

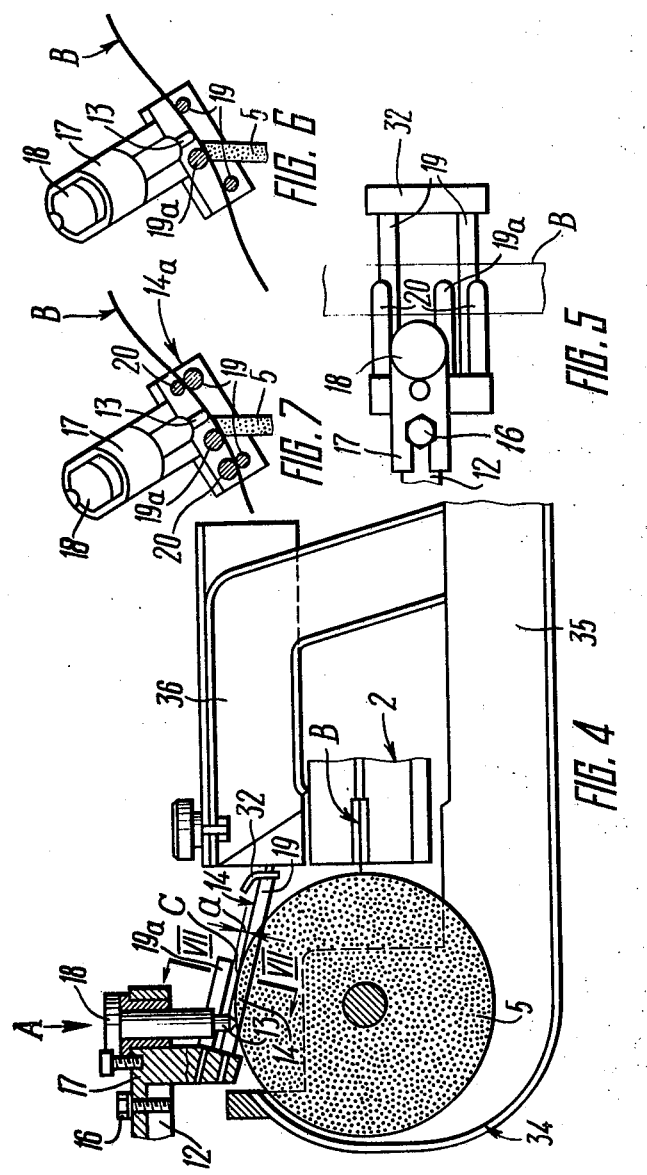

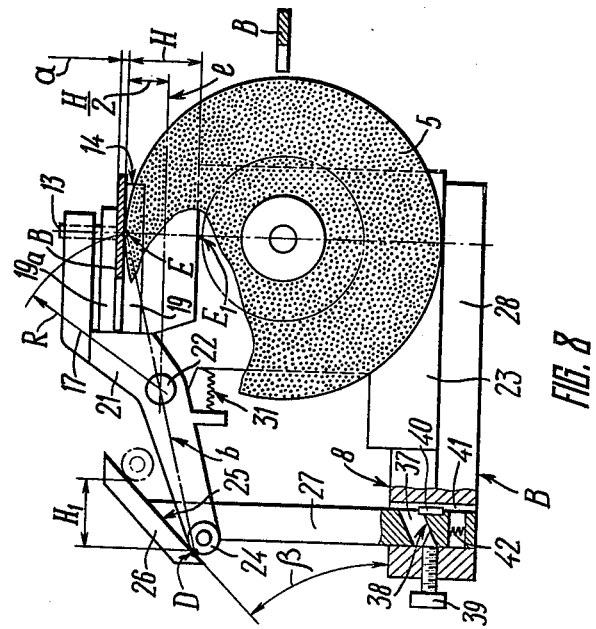
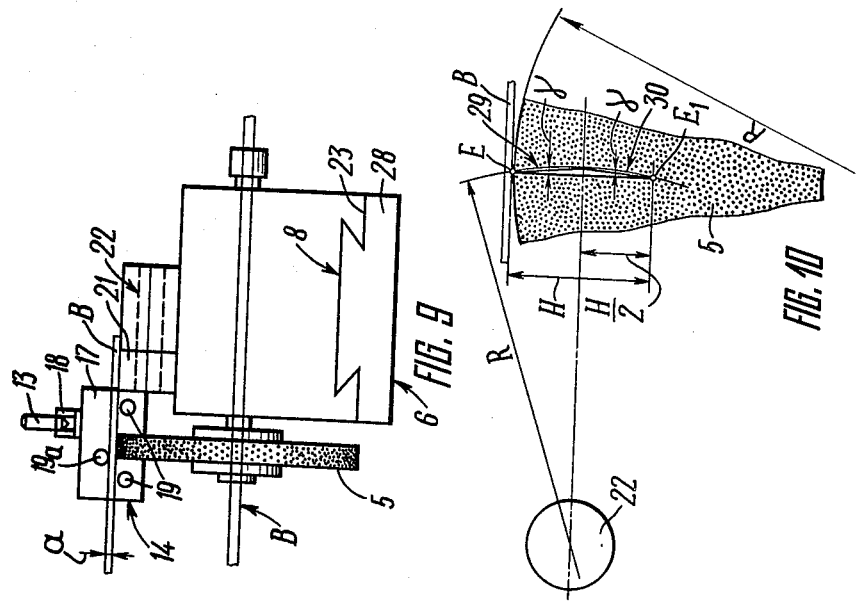

WHEELHEAD

The present invention relates to grinding machines for sharpening the teeth of band saws and, more particularly, to wheelheads for such machines.

Heretofore, wheelheads have been provided for band-saw sharpeners, having a base with guideways, whereon a support carrying a grinding wheel is mounted, and with a flat portion which serves as a guide for displacement of a holder carrying a dressing tool.

The above flat portion is inclined at 45° to the horizontal and disposed on the side opposite to the saw-teeth sharpening area. The dressing tool holder is movably mounted in the support carrying the grinding wheel on the side opposite to the teeth sharpening area.

The grinding wheel in the known wheel head only sharpens the teeth of a saw. To grind off the welds on band saws, grinders with a vice-type device for clamping the saw being ground are used.

On these machines, metal is removed from the weld on a saw until the grinding wheel comes in touch with the saw blade, and the completion of machining is ascertained by sight, which results in a rather low productivity and need for high-skill operators to handle the machine.

Moreover, special grinders used solely for grinding off welds require additional floor space.

An object of the present invention is to provide a wheelhead in a grinding machine for sharpening the teeth of band saws, whose design allows grinding off the weld on the saw as well as sharpening the teeth.

Another object of the present invention is to improve the productivity of a band-saw sharpener.

Still another object of the invention is to reduce the shop floor space needed for these operations.

In accordance with these and other objects, there is provided a wheelhead in a grinding machine for sharpening the teeth of band saws, the base of which wheelhead has horizontal guideways for a support, carrying a grinding wheel, and a flat portion, inclined at 45° to the horizontal, serving as a guide for displacement of a dressing tool holder movably mounted on the grinding wheel support on its side opposite to the saw-teeth sharpening area, wherein, according to the invention, a device for holding the saw in the process of grinding off its weld is provided, which device is mounted on the holder in the area of location of the dressing tool and has at least three supporting elements, of which two lower supporting elements are spaced apart at a distance sufficient for the passage of the grinding wheel therebetween, and the third supporting element is disposed in close proximity to the grinding wheel above said lower supporting elements, parallel thereto and at a distance therefrom substantially equal to the saw thickness, all said supporting elements being arranged at an angle equal or close to 90° to the vertical so that the saw blade held therebetween in the course of grinding off its weld is disposed at a tangent to the grinding wheel.

It is expedient to arrange the two lower supporting elements in parallel.

This parallel arrangement makes for the displacement of the saw along the supporting elements with a constant force while placing the saw therebetween.

It is also expedient that the wheelhead should have two additional supporting elements each disposed nearly a respective lower supporting element on the side opposite to the grinding wheel and over said lower supporting element at a distance substantially equal to the saw thickness.

These additional supporting elements ensure reliable holding and positioning of the saw with practically any handling action of the operator in the process of grinding off the weld.

It is expedient that the lower supporting elements should be spaced apart at a distance exceeding twice the thickness of the grinding wheel.

Such a disposition of the lower supporting elements makes possible the dressing of the grinding wheel without the removal of the device for holding the saw.

It is expedient that the holder should be made as a lever with equal arms, whose pivot is secured on the support carrying the grinding wheel in parallel with the axis of rotation of said wheel, whereas the dressing tool and the device for holding the saw are mounted at the end of one arm in such a way that they have the common point of contact with the periphery of the grinding wheel, the flat portion on the base, which serves as a guide for displacement of the lever, being made so that its point of contact with the second arm of the lever lies substantially on the straight line passing through the point of contact of the dressing tool and the device for holding the saw with the periphery of the grinding wheel and through the geometrical center of the lever's pivot.

This construction of the holder provides for automatic removal of a specified amount of metal from the weld during each cut down to the saw blade and excludes breakdowns of the wheel's working surface. Moreover, it prevents the breaking of diamond crystals off the dressing tool and overheating of these crystals while the removal of an increased amount of abrasive material from the grinding wheel takes place in dressing.

An arrangement is preferable wherein the geometrical center of the lever pivot lies on the imaginary straight line passing parallel to the base guideways through the middle of the allowed wear range of the grinding wheel.

This ensures a minimal error of compensation for the wheel wear in the process of dressing.

It is expedient to spring-load the lever in the direction of its turning.

It is desirable to mount a stop means at the ends of the lower supporting elements to limit the displacement of the saw.

It is also expedient that the flat portion serving as a guide for displacement of the holder should be disposed on the base so as to be adjusted in a vertical direction.

Such an arrangement of the flat portion provides simpler adjustment of the device for holding the saw during operation.

The wheelhead according to the present invention provides both sharpening of the teeth and grinding off the weld of a band saw on a single grinding machine. It also offers increased productivity and allows the floor space required for these operations to be reduced.

The invention will now be described by way of example with reference to the accompanying drawings, in which:

FIG. 4 is a partially sectional, side elevational view of the grinding wheel with the dressing tool and the device for holding a band saw;

FIG. 5 is a view in the direction of the arrow "A" in FIG. 4;

FIG. 6 shows an embodiment of the device for holding a band saw in section on the line VII—VII of FIG. 4;

FIG. 7 shows another embodiment of the device for holding a band saw in section on the line VII—VII of FIG. 4;

FIG. 8 is a side elevational view of an alternative embodiment of the wheelhead according to the invention;

FIG. 9 is a front elevational view of the embodiment of FIG. 8; and

FIG. 10 is a diagrammatic representation of the grinding-wheel dressing.

Figure 1:
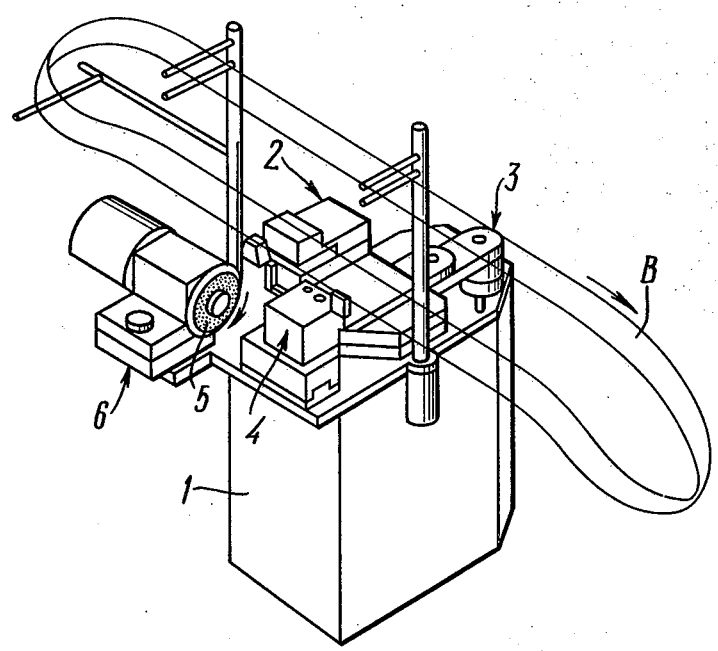
FIG. 1 shows schematically a perspective view of a machine for sharpening the teeth of band saws.

A grinding machine for sharpening the teeth of band saws comprises a bed 1 (FIG. 1) which carries a device 2 for clamping a band saw "B" on its side surfaces, a longitudinal feed mechanism 3 for intermittently feeding one tooth of the saw, a cross feed mechanism 4 for feeding the saw toward a grinding wheel 5, and a wheel head 6 with the grinding wheel 5.

The wheelhead 6 has a base 7 (FIGS. 2 and 3) with guideways 8, whereon a support 9 carrying the grinding wheel 5 is mounted.

The base 7 has a flat portion 11 inclined at 45° to the horizontal. The guide surface of the flat portion 11 faces the grinding wheel 5 and is disposed with respect to the latter on the side opposite to the teeth sharpening area.

The wheelhead 6 is provided with a holder 12 carrying a dressing tool 13 and a device 14 for holding the saw "B" in the process of grinding off its weld.

The holder 12 is mounted in vertical dovetail ways 8a, made in the support 9, and its rollers 15, mounted on its one end, bear on the flat portion 11.

At the other end of the holder 12, disposed above the grinding wheel 5, a bracket 17 is fastened by means of bolt 16 (FIG. 4). This bracket houses a mounting 18, wherein the dressing tool 13 made in the form of a diamond stick is placed and the bracket also carries the device 14 for holding the saw "B" during grinding off its weld.

The saw holding device incorporates three supporting elements: two lower elements 19, and the third, upper one 19a secured in the bracket 17.

Figures 2, 3:
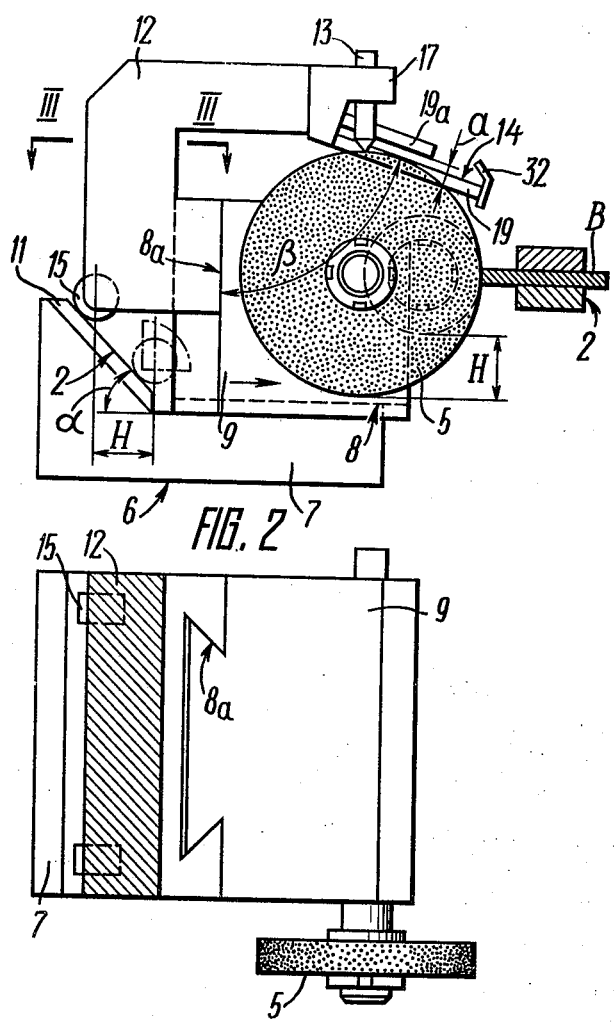
FIG. 2 is a side elevational view of the wheelhead according to the invention.
FIG. 3 is a plan view of the wheelhead according to the invention with a partial section on the line III—III of FIG. 2.

The lower supporting elements 19 are arranged in parallel with each other, as shown in FIG. 6, and are spaced apart at a distance sufficient for the passage of the grinding wheel 5 therebetween. The third supporting element 19a is disposed in close proximity to the grinding wheel 5 above and parallel to the lower supporting elements, as shown in FIG. 6. The lower elements 19 are spaced apart from the upper element 19a at a distance "a" (FIG. 4) equal to or slightly smaller than the thickness of the saw "B." The distance between the supporting elements 19 and 19a selected in this way ensures reliable holding of the saw during grinding off its weld. All the supporting elements are secured in the bracket 17 at an angle $\beta$ (FIG. 2) to the vertical, which is somewhat smaller than 90° (FIG. 2). These elements, however, may also be arranged at 90°, as shown in FIG. 8.

The distance between the lower supporting elements 19 and the grinding wheel 5 is such that the blade of the saw "B" is tangent to the grinding wheel 5 at the point "C" where should contact the saw blade after its weld is ground off.

The lower supporting elements 19 are spaced apart at a distance slightly exceeding twice the thickness of the grinding wheel 5. Such arrangement of the supporting elements 19 makes it possible to dress the grinding wheel 5 without the removal of the saw holding device 14.

Another embodiment of the saw holding device 14a (FIG. 7) features two additional supporting elements 20. Said supporting elements are disposed over the respective supporting elements 19 on the side opposite to the grinding wheel 5. The distance between the lower supporting elements 19 and the upper supporting elements 19a and 20 slightly exceeds the thickness of the saw. The elements 20 lock the saw in such a way that it does not come off the element 19a with variation of the forces acting upon the saw in any direction.

FIGS. 8 and 9 illustrate another embodiment of the wheelhead, where the holder 21 is made in the form of a lever with equal arms (the lever is also designated by the reference numeral 21). The pivot 22 of the lever is fixed on a support 23, carrying the grinding wheel 5 in parallel with the axis of rotation of said wheel. The dressing tool 13 and the saw holding device 14 are fixed at the end of one arm of the lever 21, and a roller 24 (FIG. 8), which contacts the guide surface 25 of the flat portion made in the form of a template 26, is mounted at the end of the other arm of the lever. The template 26 is rigidly fixed to an upright 27 mounted on the base 28.

The template 26 is inclined at an angle $\beta = 45°$ to the horizontal, and its guide surface 25 faces the grinding wheel 5 and the guideways 8 on which the support 23 is displaced.

The template 26 serving as a rolling guide for the roller 24 of the lever 21 is made in such a way that the point "D" of its contact with the roller 24 lies substantially on the imaginary straight line "b" passing through the common point "E" of contact of the dressing tool 13 and the saw holding device 14 with the periphery of the grinding wheel 5 and through the geometrical center of the pivot 22 of the lever 21. Such an arrangement of the holder 21 makes it possible to combine an automatic adjustment of the amount of metal removed during each cut up to completely grinding off the weld with the automatic compensation for wear of the grinding wheel in its dressing.

To obtain the wheel wear compensation (i.e., difference between the displacements H of the support and the arm of the lever 21 with the dressing tool 13) with a minimal error, the pivot 22 of the lever 21 is placed in the imaginary straight line "e" passing parallel to the guideways 8 on the base 28 through the middle $H/2$ of the allowed wear range H on the grinding wheel 5.

The diagram in FIG. 10 shows that this compensation error is minimal. The arm of the lever 21 (FIG. 8) with the dressing tool 13 moves along a circle arc.

The allowed wheel wear range (FIG. 10) extends along the straight line $E-E_1$, whereas the arm of the lever 21 moves along the arc of the circle with a radius R, i.e., virtually, along the hypotenuses of triangles 29 and 30 with the vertices E and $E_1$.

The value of radius R is selected so as to obtain the angle $\gamma$ in the triangles 29 and 30 being equal to 2° – 7°. With the angle $\gamma$ taken from this range, the value of the compensation error for the leg ($H/2$) = 20 mm (i.e., half the wheel 5 wear range) will be equal to hundredths of a millimeter over the length of 20 mm (the dressing tool moves practically along the hypotenuse of the triangle). As the straight line "$e$" halves the allowed wear range "H" of the grinding wheel, the increase of the compensation error by several hundredths of a millimeter will take place over the length $H/2$ = 20 mm, as the triangle 29 illustrates; the compensation error will decrease over the second half $H/2$ = 20 mm of the wear range by the same value, that is, several hundredths of a millimeter. The wear compensation error at the point $E_1$ will be equal to zero. This error is insignificant and does not appreciably affect grinding off the weld and sharpening the teeth of band saws.

The lever 21 is spring-loaded by a spring 31 (FIG. 8) located between this lever and the support 23. The spring 31 provides a constant-value removal of metal during grinding off the weld of the saw "B."

A stop 32 is disposed at the ends of the supporting elements 19 (FIGS. 2, 4, 5) to limit displacement of the saw, that is, to prevent the saw from spontaneously slipping out of the device 14.

The grinding wheel 5 is furnished with a protective cover 34 (FIG. 4) and dust-suction hoses 35 and 36, the arrangement being such that the saw holding devices 2 and 14 are conveniently located in respect thereof.

The upright 27 (FIG. 8) is secured on the base 28 so as to be adjusted in a vertical direction and for this purpose at the lower portion of the upright 27 a through opening 37 is made with the lower surface 38 thereof being inclined at an angle not exceeding 14°, that is, the angle of repose. A screw 39 connecting the upright 27 with the base 28 enters the opening 37 with its tapered end.

The tapered end of the screw 39 and the inclined surface 38 in the upright 27 define a wedge adjuster. The upright 27 houses a key 40 fitting into a vertical slot 41 in the base 28. This key joint prevents the upright 27 from turning. The upright 27 is spring-loaded from below by a spring 42. Such a mounting of the upright 27 in the base 28 allows all the clearances between these parts to be taken up, which, in turn, provides for accurate dressing of the grinding wheel 5 and completely excludes the effect of vibrations during the operation of the wheelhead on the position of the dressing tool 13 and the saw holding device 14 with respect to the periphery of the grinding wheel 5. Besides, such an arrangement of the upright 27 makes it possible to adjust the position of the dressing tool 13 and the saw holding device 14 relative to the grinding wheel 5 in the process of running the machine.

The arrangement of the upright 27 ensures rigidly securing the dressing tool 13 in the holding lever 21, which simplifies a complicated and accurate construction of a holder for the dressing diamond stick.

The wheelhead operates as follows.

Before the operation is started, the clearance between the periphery of the grinding wheel 5 and the upper supporting element 19a, which corresponds to the thickness of the saw to be ground, is set with the aid of a feeler gauge. By displacing it along the supporting elements 19, the saw "B" is brought into engagement with the grinding wheel 5. The bulging portion of the weld is ground off in moving the saw toward the rotating grinding wheel 5 and slightly reciprocating it axially relative to the wheel 5 for ensuring a uniform wear thereof, the wheel 5 not touching the portions of the saw blade adjoining the weld. After the weld is ground off on one side of the saw "B," the latter is turned over, and the weld on the opposite side of the saw is ground off. Since the supporting element 19a is spaced apart from the supporting elements 19 at a distance substantially equal to the saw blade thickness, the saw will always be positioned convexly relative to the grinding wheel 5, which makes it possible to grind off the weld only, without touching the saw blade.

In the process of operation, the grinding wheel 5 wears out. As this takes place, the dressing tool 13 is advanced together with the holder 12 toward the grinding wheel 5. Here, the holder 12 lowers, traveling on the rollers 15 along the guide surface of the flat portion 11.

As it lowers, the holder 12, moving along the base guideways 8a, urges the support 9, carrying the grinding wheel 5, to move toward the saw clamping device 2.

The amount by which the grinding wheel 5 is advanced equals the thickness of the abrasive material layer removed by the dressing tool 13.

During grinding off the weld on the saw "B" and dressing the grinding wheel 5, the particles of abrasive material and metal fly away at a tangent in the direction opposite to the operator's place and are sucked by the two dust-suction hoses 35 and 36.

The grinding wheel is covered virtually all around, and dust particles cannot fly beyond the protective enclosure.

The mode of operation of another embodiment of the invention is as follows.

First, the force developed by the spring 31 is adjusted, which is done, as a rule, in the process of initial adjustment of the wheelhead after its assembly. The force of the spring 31 is adjusted so as to provide for the removal of the weld metal surplus in several cuts, the amount of metal removed in every cut being adjusted by itself. This results from the fact that the force of the spring together with the weight of the arm of the lever 21 slightly exceeds the cutting force during grinding. Then, the value "$a$" (clearance between the supporting elements 19 and 19a) is adjusted in such a way that it is equal to or smaller than the saw blade thickness. As the grinding of the weld is started, the roller 24 comes off the template 26 by a small amount equal to the height of the weld metal minus the amount of metal removed in one cut. With every following cut, the distance between the roller 24 and the template 26 decreases until the roller comes in touch with the template. Since the average height of the weld metal in butt welding is 1 - 2 mm, the possibility of grinding off the weld in several stages allows the damage wear of the grinding wheel to be prevented.

As in this case the grinding wheel 5 wears out normally, no adjustment for every saw to be ground is required; therefore, grinding off the welds up to a specified amount of the metal removed is possible without re-adjustment for a whole batch of saws.

In the process of running the machine, the operator dresses the grinding wheel 5 with the dressing tool 13. As is described hereinbefore, the template 26 is arranged at an angle $\alpha$ = 45° to guideways 8, and the lever 21 has equal arms; so, in turning the lever by 1 mm, an abrasive material layer of 1 mm thick will be removed from the grinding wheel 5, and the wheel wear will also be compensated for the same value. Since the point of contact E is common for the dressing tool 13 and the saw holding device 14, the supporting element 19 will continuously follow up the decreasing diameter of the grinding wheel 5 during its dressing, so ensuring a constant thickness of the saw blade in its weld area for the whole batch of saws.

It is a rather frequent occurrence in dressing grinding wheels 5 that the operator sets erroneously the dressing tool to increased removal of abrasive material. This results in breaking the diamond crystals off the mounting 18, which leads to rapid failure of the dressing tool 13. The wheelhead being proposed totally excludes the crumbling of the diamond crystals because in case of an increased removal of abrasive from the grinding wheel 5, the lever 21 will turn counter-clockwise through some angle and prevent damage to the diamond.

In setting up the dressing tool 13 and the saw holding device 14 with respect to the periphery of the grinding wheel 5, pressure from the spring 31 is transmitted through the lever 21 to the template 26, so providing some bending moment on the upright 27. Therefore, all the clearances between the upright and the base 28 are taken up. Besides, the spring 31 together with the spring 42 ensures additional compensation for clearances in the wedge adjuster (the screw 39 and the inclined surface 38 in the upright 27). Such a construction makes possible the positional adjustment of the dressing tool 13 and the saw holding device 14 to an accuracy of thousandths of millimeter, this adjustment not being upset in the process of operation.

It will be apparent from the above description that the wheelhead according to the invention provides grinding off the weld on band saws as well as sharpening the teeth thereof. Moreover, additional time needed for clamping a saw in any device when grinding off its weld is here excluded. The welds on saws are ground off by the operator manually to a high accuracy and surface finish for the whole batch of saws.

What is claimed is:

1. A wheelhead in a grinding machine for sharpening the teeth of band saws, comprising: a base; horizontal guideways made on said base; a support mounted in said guideways; a grinding wheel mounted on said support and serving for sharpening the teeth of a band saw; a flat portion on said base on the side thereof opposite to the saw-teeth sharpening area, said flat portion being inclined at 45° to the horizontal; a holder movably mounted on said support and bearing on said flat portion which serves as a guide for displacement of said holder; a dressing tool to dress said grinding wheel, said dressing tool being mounted in said holder; a device for holding the saw in the course of grinding off its weld, said device being mounted in said holder in the area of location of the dressing tool and having at least three supporting elements, of which two lower supporting elements are spaced apart at a distance sufficient for the passage of said grinding wheel therebetween, and the third supporting element is disposed in close proximity to said grinding wheel above said lower supporting elements, parallel thereto and at a distance therefrom substantially equal to the saw thickness, all said supporting elements being arranged at an angle equal or close to 90° to the vertical so that the saw blade held therebetween in the course of grinding off its weld is disposed at a tangent to said grinding wheel.

2. A wheelhead as claimed in claim 1, wherein the two lower supporting elements are arranged in parallel.

3. A wheelhead as claimed in claim 1, which is provided with two additional supporting elements each disposed nearby a respective lower supporting element on the side opposite to the grinding wheel and over said lower supporting element at a distance substantially equal to the saw thickness.

4. A wheelhead as claimed in claim 1, wherein said lower supporting elements are spaced apart at a distance exceeding twice the thickness of the grinding wheel.

5. A wheelhead as claimed in claim 1, wherein said holder is made in the form of a lever with equal arms, whose pivot is secured on said support carrying the grinding wheel, in parallel with the axis of rotation of said wheel, said dressing tool and said device for holding the saw being mounted at the end of one arm in such a way that they have the common point of contact with the periphery of the grinding wheel, the flat portion on the base, serving as a guide for displacement of the lever, being made so that its point of contact with the other arm of the lever lies substantially on the straight line passing through the common point of contact of the dressing tool and the device for holding the saw with the periphery of the grinding wheel and through the geometrical center of the pivot for the lever.

6. A wheelhead as claimed in claim 1, wherein the geometrical center of the pivot for the lever lies on the imaginary straight line passing parallel to the guideways on the base through the middle of the allowed wear range of the grinding wheel.

7. A wheelhead as claimed in claim 5, wherein the lever is spring-loaded in the direction of its turning.

8. A wheelhead as claimed in claim 1, wherein a stop means to limit the displacement of the saw being ground is positioned at the ends of the lower supporting elements.

9. A wheelhead as claimed in claim 5, wherein said flat portion serving as a guide for displacement of the holder is disposed on the base so as to be adjusted in a vertical direction.

* * * * *